June 6, 1933.  W. N. BOOTH  1,913,065
ASSEMBLING APPARATUS
Filed Aug. 13, 1928    2 Sheets-Sheet 1
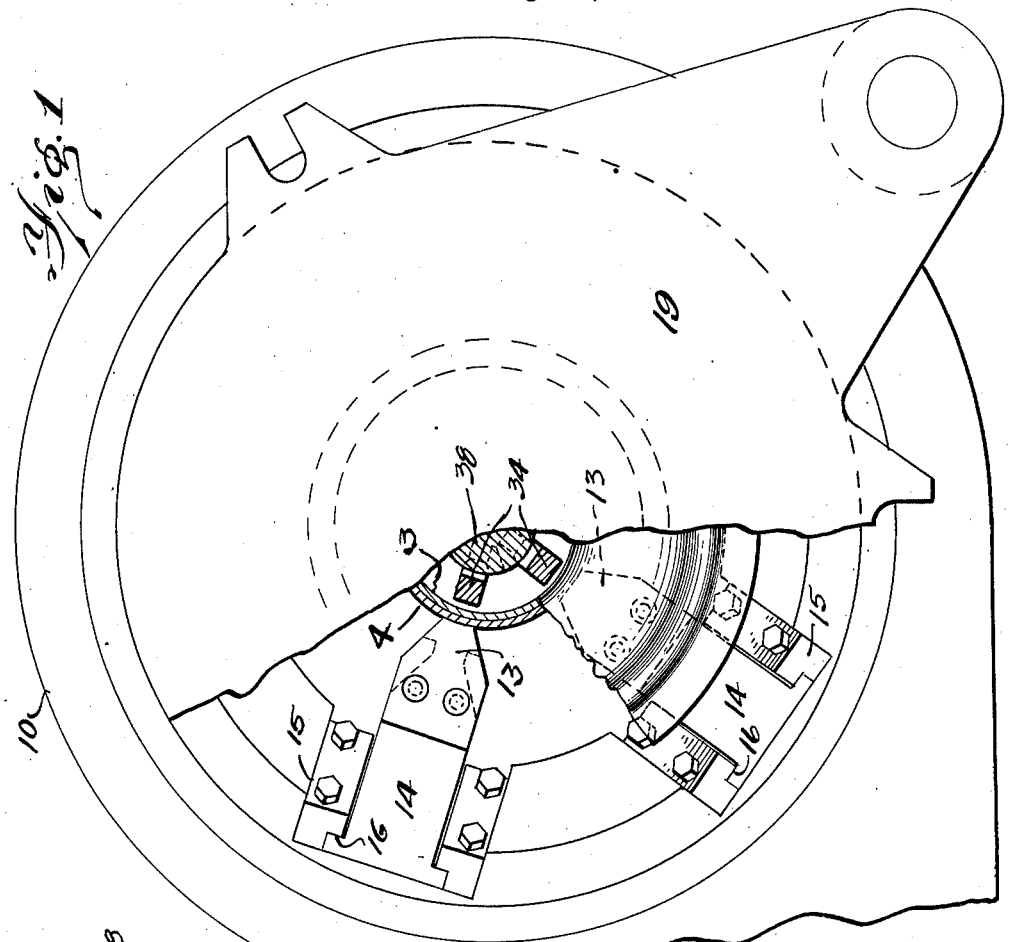
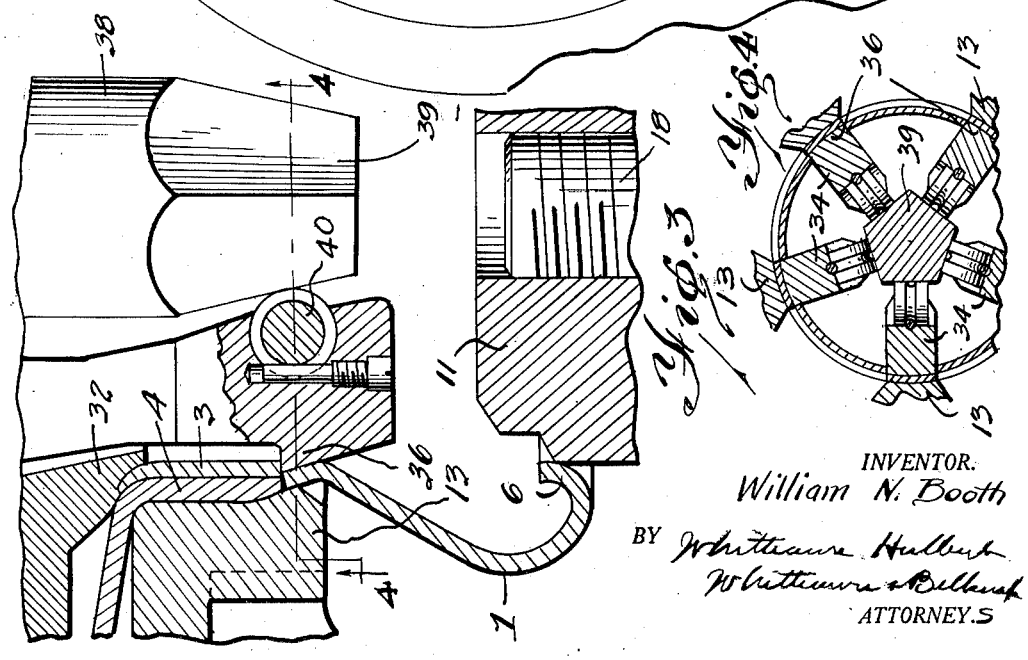
INVENTOR.
William N. Booth
BY
ATTORNEYS June 6, 1933.  W. N. BOOTH  1,913,065
ASSEMBLING APPARATUS
Filed Aug. 13, 1928   2 Sheets-Sheet 2
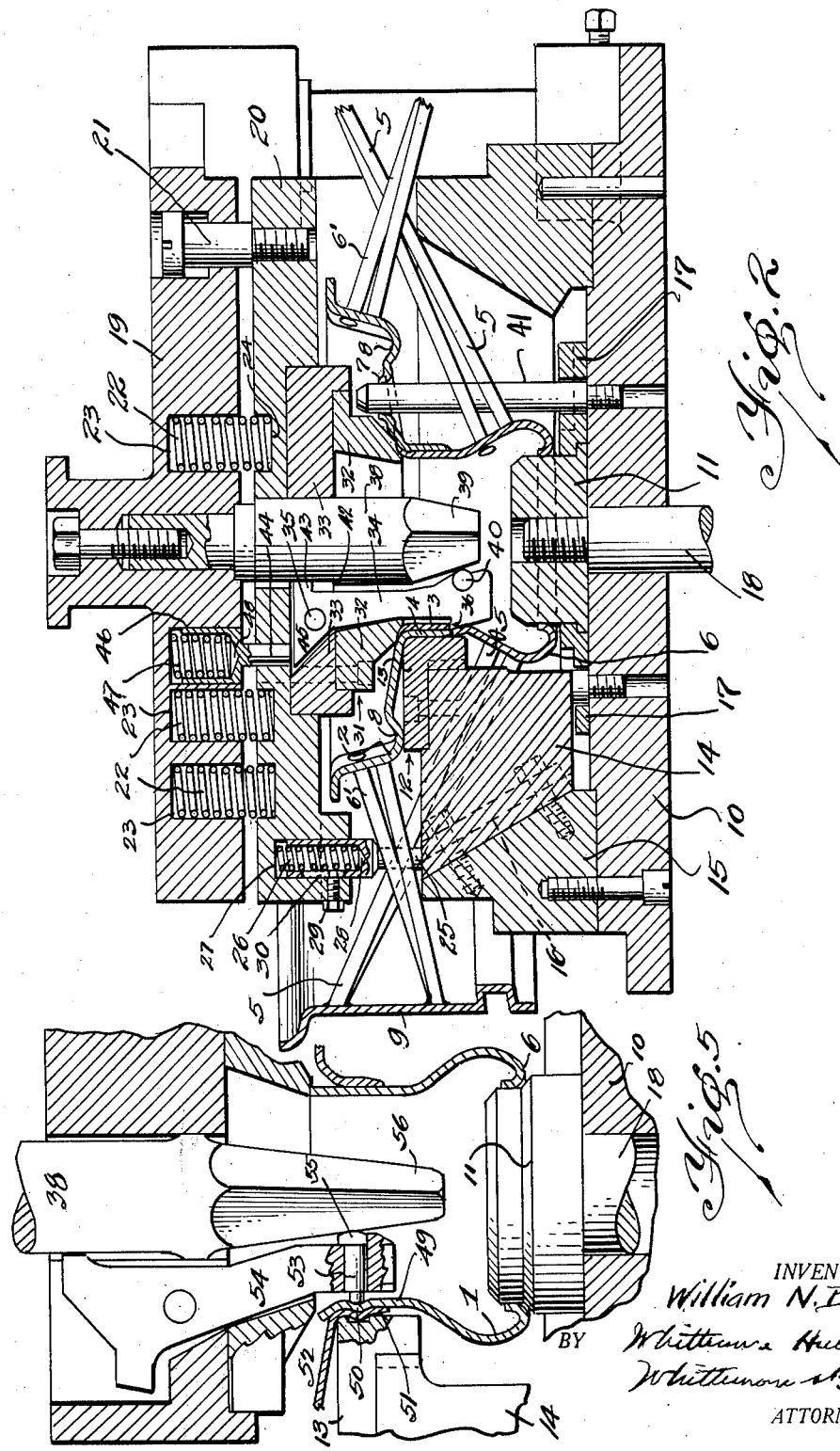
INVENTOR.
William N. Booth.
BY Whittemore Hulbert
Whittemore Belknap
ATTORNEYS Patented June 6, 1933

1,913,065

UNITED STATES PATENT OFFICE

WILLIAM N. BOOTH, OF DETROIT, MICHIGAN, ASSIGNOR TO KELSEY-HAYES WHEEL CORPORATION, OF DETROIT, MICHIGAN, A CORPORATION OF NEW YORK

ASSEMBLING APPARATUS

Application filed August 13, 1928. Serial No. 299,388.

The invention relates to assembling apparatus and is particularly applicable to an apparatus for assembling an article having telescoping parts, such as a two part hub shell of a vehicle wheel. One of the objects of the invention is to so construct the apparatus that it automatically operates to move two telescoping parts relative to each other and to then secure these parts to each other. Another object is to provide means constructed to engage a part intermediate the enlarged ends of the article and to permit ready insertion or removal of the article into or from the apparatus. With these as well as other objects in view, the invention resides in the novel features of construction and combinations and arrangements of parts as more fully hereinafter set forth.

In the drawings:—

Figure 1 is a plan view, partly broken away, of an apparatus embodying my invention;

Figure 2 is a vertical section through Figure 1;

Figure 3 is a similar enlarged view of a portion thereof;

Figure 4 is a cross section on the line 4—4 of Figure 3;

Figure 5 is a view similar to Figure 3, showing a modification.

The apparatus shown in the present instance is designed to assemble a two part hub shell of a vehicle wire wheel. This hub shell comprises the barrel part 1 and the flange part 2 having the reduced inner and outer telescoping portions 3 and 4, respectively. The barrel part has an enlarged front end to which the inner ends of the front wire spokes 5 of the wheel are connected and which terminates in the rearwardly bent annular flange 6. The flange part has a transversely extending flange portion to which the inner ends of the rear wire spokes 6' of the wheel are connected. This flange part also has the rearwardly tapered projections 7 and the forwardly offset annular reinforcing rib 8 radially outward of the projections 7. The outer ends of these spokes are connected to the felly member 9. In assembling the wheel the front and rear spokes are connected to their respective parts of the hub shell and to the felly member, while the parts of the hub shell occupy a position such that the connection of the spokes to the hub shell and felly member does not place the spokes under any tension. The barrel and flange parts of the hub shell occupy, however, the same angular position relative to each other as in the completed wheel having tensioned spokes. To tension the spokes the parts of the hub shell are axially moved relatively away from each other to axially separate the spoke engaging portions of these parts, after which the parts are permanently secured to each other to maintain the spokes under tension.

The assembling apparatus has the base 10 above which is mounted the pilot 11 for engaging the flange 6 of the barrel part 1 to axially guide this part. 12 is a collapsible die mounted upon the base 10 and having the die blocks 13 formed with inner and upper faces adapted to respectively engage the telescoping portion 4 and the annular reinforcing rib 8 of the flange part 2. These die blocks are mounted upon the carrier blocks 14 which have inclined outer faces for engaging correspondingly inclined faces of the ring 15 mounted upon and secured to the base 10. These carrier blocks are guided by suitable gibs 16. The widths of the die blocks and carrier blocks are such that they may extend between adjacent front spokes 5. For raising the die blocks to expand the die and thereby provide for insertion or removal of the hub shell, the pilot 11 carries the kick-out plate 17, which extends beneath the carrier blocks 14. This pilot is adapted to be raised out of engagement with the base 10 by suitable means such as the plunger 18, which extends upwardly through the base 10 and may be actuated by any suitable means such as an air cylinder.

19 is a holder which may be secured to a vertically reciprocable ram of a press to be raised and lowered toward and away from the base 10. 20 is a second holder carried by the holder 19 through suitable means such as the shouldered bolts 21 which in the uppermost position of the holder 19 support the holder 20 at a predetermined distance below the holder 19. 22 are coil springs extending within aligned recesses 23 and 24 in the holders 19 and 20, respectively, for normally maintaining the holder 20 spaced below the holder 19. 25 are plungers slidably engaging the holder 20 and depending therefrom and normally forced downwardly by means of the coil springs 26 which abut the ends of the recesses 27 in which the plungers are slidable and the ends of the recesses 28 in the plungers. These plungers are held from disengagement from the holder 20 by means of the cap bolts 29 threaded into the holder 20 and having inner ends engaging in longitudinally extending slots 30 in the sides of the plungers. There is a plunger 25 for each carrier block 14 of the collapsible die.

31 is a die fixedly secured to the holder 20 in axial alignment with the pilot 11 and comprising the annular die block 32 and the carrier block 33 in the lower face of which the die block 32 engages. The lower end of the die block 32 is engageable with the rear end of the barrel part 1 of the hub shell, this rear end in the present instance being in the nature of a flared flange. 34 are members for securing the barrel and flange parts of the hub shell together after they have been relatively adjusted. These members have heads at their upper ends which extend within radial slots in the carrier blocks 33 and are pivotally connected to this carrier block by the pins 35. These members extend downwardly through the die block 32 and have near their lower ends and at their outer sides the projections 36 for engaging the barrel part 1 and punching or embossing the same radially outwardly to secure the barrel part in fixed position relative to the flange part. For operating the securing members 34, I have provided the plunger 38 which is fixedly secured to the holder 19 and extends axially downwardly through the holder 20, the carrier block 33 and the die block 32 between the securing members. The lower end of this plunger has the beveled sides 39 which operate to swing the securing members about their pivots and to force their projections 36 into the hub part 1 to punch or emboss the latter. The securing members 34 are preferably provided at their lower ends and inner edges with the rolls 40 for contacting with the beveled sides 39.

For peripherally positioning the hub shell so that the front spokes 5 of the wheel when inserted into the apparatus will not interfere with the operation of the collapsible die 12, I have provided the pilots 41 which are mounted upon the base 10 and extend upwardly through the kick-out plate 17 and are engageable with certain of the projections 7 upon the flange part 2.

In operation and assuming the holder to be in its uppermost position and the die 12 to be expanded and also in its uppermost position, the apparatus is in condition for the insertion of a vehicle wheel with the annular reinforcing rib 8 of the flange part 2 engaging the die blocks 13 and certain of the projections 7 of the flange part 2 engaging the pilots 41. Upon downward movement of the holder 19 the holder 20 is also carried down by means of the coil springs 22 to engage the plungers 25 with the carrier blocks 14 and to lower these carrier blocks by means of the coil springs 26, thereby moving the carrier blocks and their die blocks 13 radially inward between the front spokes 5 of the wheel to bring the inner faces of the die blocks into engagement with the telescoping portion 4 of the flange part 2. At this time the carrier blocks 14 are rigidly supported upon the base 10 through the kick-out plate 17, the pilot 11 also resting upon the base. Upon continued downward movement of the holder 19 and the holder 20 the coil springs 26 are compressed and the die block 32 is brought into contact with the rear end of the hub part 1 and moves this hub part downwardly away from the flange part, the flange 6 of the hub part being guided by the pilot 11. This movement of the hub part relative to the flange part places the spokes of the wheel under tension. During this downward movement of the die block 32 the securing members 34 are also moved downwardly to bring their punching or embossing projections 36 into proper position relative to the hub part 1. Further downward movement of the holder 19 compresses the coil springs 22 and lowers the plunger 38 to bring its beveled sides 39 into contact with the rolls 40 to force the punching or embossing projections 36 radially outward to punch or emboss the hub part 1 and thereby permanently secure the hub part to the flange part. The holder 19 may then be raised and during its raising the plunger 38 will first be raised, the holder 20 will next be raised and the plungers 25 will then be raised, after which the die 12 may be expanded by raising the pilot 11 and associated kick-out plate 17.

For the purpose of assuring radial inward movement of the inner ends of the securing members 34 prior to raising thereof, the plunger 38 is provided with the shoulders 42 which are engageable with the lateral projections 43 upon the heads of the securing members. To normally hold the lower ends of these securing members radially inward, I have provided the plungers 44 which are engageable with the other lateral projections 45 of the heads of these securing members and slidably extend through the holder 20 and slidably engage the walls of the recesses 46 in the holder 19, these plungers being normally held in their lowermost positions by means of the coil springs 47 which abut the ends of the recesses 46 and the ends of the recesses 48 in the plungers.

In the modification above described, the punched out or embossed portions of the barrel part 1 are located at the front end of the telescoping portion 4 of the flange part 2, the flanged rear end of the barrel part tightly engaging the rear end of the telescoping portion 4.

In the modification shown in Figure 5, the structure of the hub shell is the same as that shown in the modifications of Figures 1 to 4, inclusive, with the exception that the rear end of the barrel part 49 of the hub shell is provided with radial outwardly punched or embossed portions 50 for engaging the rear end of the telescoping portion 51 of the flange part 52 of the hub shell. The apparatus is also the same with the exception that the punching or embossing projections 53 are formed of separate members extending through and carried by the securing members 54, these separate members having heads 55 at their inner ends which are slidably engaged by the tapered sides at the lower end of the plunger 56. These punching or embossing projections are located to punch out or emboss parts of the telescoping portions of the hub part and flange part intermediate the ends of the telescoping portions.

What I claim as my invention is:

1. In an apparatus for assembling an article having telescoping parts, the combination of a die for supporting one of the parts, a holder movable toward and away from said die, a second die carried by and movable relative to said holder for engaging the other of the parts and moving the same relative to the first mentioned part, means for normally forcing said second die away from said holder, means for securing the parts to each other in their adjusted relative positions including an element carried by said second die, and means carried by and movable with said holder for operating said securing means.

2. In an apparatus for assembling an article having telescoping parts, the combination of a die for supporting one of the parts, a holder movable toward and away from said die, a second holder normally spaced from said first mentioned holder, means for normally holding said holders apart, a second die carried by said second holder and engageable with the other part to move the same relative to the first mentioned part, means for securing the parts to each other in their adjusted relative positions including an element carried by said second die, and a plunger carried by said first mentioned holder for operating said securing means.

3. In an apparatus for assembling an article having parts with telescoping portions, contractible means for engaging the outer of the portions of one part, means movable transversely of said contractible means for engaging the other of the parts and moving the same relative to the first mentioned part, and means for securing the parts to each other in their adjusted relative positions.

4. In an apparatus for assembling an article having parts with telescoping portions, contractible means for engaging the outer of the portions of one part, means movable transversely of said contractible means for engaging the other part to move the same relative to the first mentioned part, and means movable relative to said second mentioned means for securing the telescoping portions together with the parts in their adjusted relative positions.

5. In an apparatus for assembling an article having parts with telescoping portions, contractible means for engaging the outer of the portions of one part, means movable transversely of said contractible means for engaging the other part to move the same relative to the first mentioned part, means carried by said second mentioned means for securing the parts to each other in their adjusted relative positions, and means for operating said securing means.

6. In an apparatus for assembling an article having parts with telescoping portions, contractible means for engaging the outer of the portions of one part, a holder movable transversely of said contractible means, means carried by said holder and engageable with the other part for moving the same relative to the first mentioned part, means dependent upon the movement of said holder toward said first mentioned means for contracting the same prior to engagement of said second mentioned means with its part, and means for securing the parts to each other in their adjusted relative positions.

7. In an apparatus for assembling an article having parts with telescoping portions, contractible means for engaging the outer of the portions of one part, a holder movable transversely of said contractible means, means carried by said holder for engaging the other part to move the same relative to the first mentioned part, means dependent upon the movement of said holder for contracting said first mentioned means prior to engagement of said second mentioned means with its part, means carried by said second mentioned means for securing said parts in their adjusted relative positions, and means for automatically operating said securing means.

8. In an apparatus for assembling an article having telescoping parts, the combination with contractible means for engaging the outer of the parts, means movable transversely of said contractible means for engaging the inner of the parts to move the same relative to the first mentioned part, means dependent upon the movement of said second mentioned means for contracting the first mentioned means prior to engagement of said second mentioned means with its parts, and means for securing the parts together in their adjusted relative positions.

9. In an apparatus for assembling an article having parts with telescoping portions, contractible means for engaging the outer of the portions of one part, a holder movable transversely of said contractible means, means carried by and movable relative to said holder for engaging the other part to move the same relative to the first mentioned part, means dependent upon the movement of said second mentioned means for contracting said first mentioned means prior to engagement of said second mentioned means with its part, and means carried by said holder for effecting the securing of the parts to each other in their adjusted relative positions.

10. In an apparatus for assembling an article having parts with telescoping portions, contractible means for engaging the outer of the portions of one part, a holder movable transversely of said contractible means, a second holder carried by said first mentioned holder and movable relative thereto, means carried by said second holder for engaging the other of the parts to move the same relative to the first mentioned part, means dependent upon the movement of said second holder toward said contractible means for contracting the latter prior to engagement of said second mentioned means with its part, means carried by said second mentioned means for securing the parts in their adjusted relative positions, and means carried by said first mentioned holder for operating said securing means.

11. In an apparatus for assembling an article having parts with telescoping portions, the combination with a base, of means upon said base for engaging one of the parts to position the same, contractible means upon said base for engaging the outer of the portions of one of the parts and supporting this part, means movable transversely of said contractible means for engaging the other of the parts to move the same relative to the first mentioned part, and means carried by said transversely movable means for securing the parts to each other in their adjusted relative positions.

12. In an apparatus for assembling an article having parts with telescoping portions, the combination with a base, of a pilot upon said base for guiding one of the parts, means upon said base for engaging the other of the parts to peripherally position the article, contractible means supported upon said base in predetermined relation to said means for engaging the outer of the portions of one part and supporting this part, means movable transversely of said base for engaging the other of the parts and moving the same relative to the first mentioned part, means carried by said transversely movable means for securing the parts to each other in their adjusted relative positions, and means for operating said securing means.

13. In an apparatus for assembling a wheel hub shell having barrel and flange parts telescopically engaging each other, the combination with a base, of a pilot upon said base for guiding the barrel part, means upon said base for engaging the flange part to peripherally position the hub shell, contractible means supported upon said base in predetermined relation to said means for engaging the telescoping portion of said flange part and supporting this part, means movable transversely of said base for engaging the barrel part and moving the same relative to and away from the flange part, means carried by said last mentioned means operable to secure the barrel and flange parts to each other in their adjusted relative positions, and automatic means for successively operating said contractible means, transversely movable means and securing means.

14. In an apparatus for tensioning the spokes of a wire wheel having a hub shell provided with a plurality of parts, the combination of means for moving the parts relative to each other for tensioning the spokes, and means for securing the parts to each other while held in their adjusted relative positions.

15. In an apparatus for tensioning the spokes of a wire wheel formed with a hub shell having a barrel part and a flange part telescopically engaging each other, the combination of means for moving one of the parts relative to the other part for tensioning the spokes of the wheel, and means for securing said parts to each other while held in their adjusted relative positions including an element movable in a direction transverse to the direction of relative movement of said parts.

16. In an apparatus for assembling an article having telescoping parts, the combination of means for moving one of the parts away from another part, and means operable in dependence upon the operation of the means aforesaid for securing the parts to each other while held in their adjusted relative positions.

17. In apparatus for tensioning the spokes of a wire wheel having a hub shell provided with a part forming an anchorage for the inner ends of one series of spokes and provided with another part forming an anchorage for the inner ends of another series of spokes and fashioned to telescopically engage the part aforesaid, the combination of means for moving the parts relatively of each other to tension the two aforesaid series of spokes, and means operable in timed relation to the aforesaid means for securing the parts to each other.

In testimony whereof I affix my signature.

WILLIAM N. BOOTH.